Oct. 19, 1937.　　　W. C. ERWIN　　　2,096,234
PIPE SWEDGE
Filed Feb. 8, 1936

Inventor
Weldon C. Erwin.

Attorney.

Patented Oct. 19, 1937

2,096,234

UNITED STATES PATENT OFFICE 2,096,234

PIPE SWEDGE

Weldon C. Erwin, Huntington Park, Calif., assignor to John Grant, Los Angeles, Calif.

Application February 8, 1936, Serial No. 62,934

10 Claims. (Cl. 153—81)

This invention has to do with an improved type of pipe swedge that operates by advancement through the pipe to expand it from collapsed condition, and, if desired, simultaneously to round out the pipe to substantially true circular form. While it is generally useful for swedging all kinds of pipe, the invention has been made particularly to provide a tool for expanding and rounding out collapsed casing in wells, and for eliminating many of the disadvantages and undesirable features of the usual well casing swedges.

The present tool may be characterized as a rotatably driven type comprising a member shaped to expand the pipe by advancement through it, and means whereby rotation of the driving stem causes a succession of advancing blows to be imparted to the swedging member. The latter operates to expand the pipe to generally rounded form, and, for certain types of work, the degree of expansion and rounding out accomplished by the swedging member may be sufficient. However, I generally prefer to include in the tool, additional means for rounding the pipe to true circular form immediately following the expansive action of the swedging member. For this purpose I provide, preferably, a plurality of circularly spaced rollers carried on the body of the tool, these rollers fitting the casing closely and traveling in a true circular path.

In its preferred form, my improved pipe swedge comprises a body connected with the rotatable driving stem, a mandrel extending axially from the body, and a tapered swedge sleeve carried on the mandrel and movable longitudinally and rotatably relative to both the mandrel and body. The body and swedge sleeve are provided with interengaging annular cam surfaces having abrupt shoulders arranged so that as it rotates relative to the sleeve, the body slips off the shoulders and strikes the sleeve to deliver to it a succession of blows at a frequency in accordance with the rate at which the body is rotated. The sleeve thus is driven between the collapsed walls of the pipe, and immediately after the walls became expanded, they are engaged by the rollers and rounded out to true circular form. In addition to the efficiency and ease with which it operates, the present tool is characterized by its extremely simple and rugged construction, and, consequently, its great strength and ability to withstand the severe conditions incident to its use.

The above mentioned as well as numerous features and advantages of the invention will be more fully understood and explained to better advantage in the following detailed description of the invention in one of its typical and preferred forms.

Throughout the description reference is had to the accompanying drawing, in which.

Figure 1:
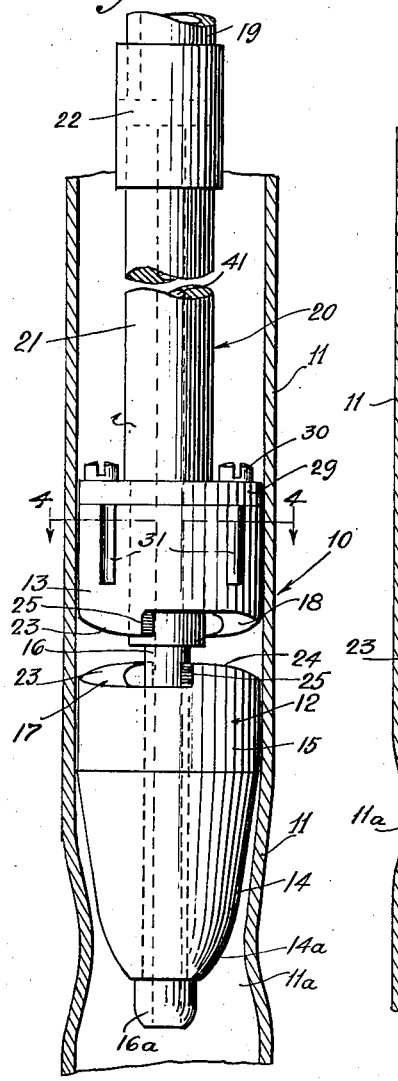
Fig. 1 is an elevation showing the swedge within a well casing, the body and sleeve sections being parted to more clearly illustrate the cam surfaces.

In the drawing, the swedging tool, generally indicated at 10, is shown positioned within the well casing 11 at a point above the partially collapsed portion 11a thereof. For purposes of description, the pipe swedge 10 may be regarded in one aspect as comprising a pair of relatively rotatable body sections 12 and 13, section 12 comprising the swedging member which expands the collapsed walls 11a of the casing as it is driven between them, and section 13 the driving member which drives the swedging member as the two sections rotate relatively, section 12 has a generally tapering curved shape along its lower surface 14 below its upper cylindric portion 15 which more or less closely fits the wall of the casing. The surface 14 is substantially straight for a distance, and then curves inwardly at its lower end, as illustrated at 14a.

Structurally, the tool may also be considered as comprising a body 13, a mandrel 16 extending axially below the lower end of the body, and a swedge sleeve 12 which is movable longitudinally and rotatable relative to both the mandrel and body 13. Longitudinal movement of sleeve 12 on the mandrel 16 is limited downwardly by engagement of the sleeve with an enlargement 16a on the lower end of the mandrel, and upwardly by engagement between cam surface 17 on the upper end of the sleeve with a correspondingly shaped cam surface 18 on the body. In effect, the body 13 and mandrel 16 are integral, although for convenience in construction the body proper may be formed by a sleeve 13a having a tightly shrunk fit on the upper enlarged diameter portion 16b of the mandrel.

The pipe swedge is operated by a rotatably driven stem which, in the present instance, consists of the drill pipe 19 and a connection 20 with body 13 of the tool. The connection at 20 may be of any suitable type, and is here shown typically as comprising a shank 21 in the form of an upper continuation of the mandrel 16, and connected to the drill string by coupling 22. As will be apparent, both downward pressure and rotational movement may be applied to the tool by way of the pipe 19 and drive stem 21.

The annular opposed end faces 17 and 18 of sleeve 12 and the body 13, are shaped to provide inclined cam surfaces 23 and 24 terminating abruptly at the vertical slip-off shoulders 25 spaced 180° apart. As best illustrated in Fig. 2, the cam surfaces 23 adjacent the shoulders 25 are substantially straight, i. e., without appreciable slope, as are also the surfaces 26 between the sloping cam surfaces and the bases of shoulders 25.

Figure 2:
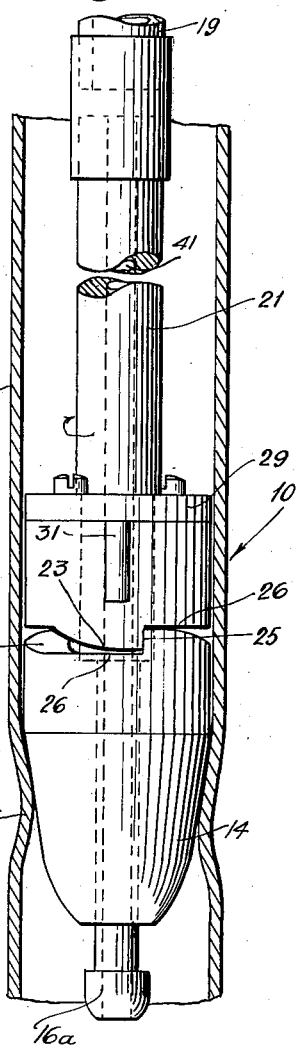
Fig. 2 is a view similar to Fig. 1 showing the parts at the slip-off position.
Figure 3:
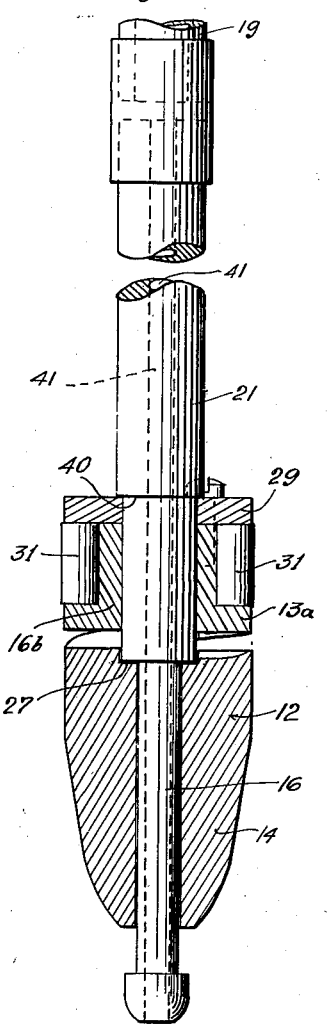
Fig. 3 is a sectional view similar to Fig. 2.

Referring now to Fig. 3, the upper end of sleeve 12 is counterbored to receive the large diameter portion 16b of the mandrel, and to provide a stop shoulder 27 which is engaged by the mandrel to limit downward movement of the body 13 relative to sleeve 12 and to prevent cam surfaces 23 on the body from engaging the sleeve surfaces 26, when the parts have rotated relatively to the slip-off position of Fig. 2.

Figure 4:
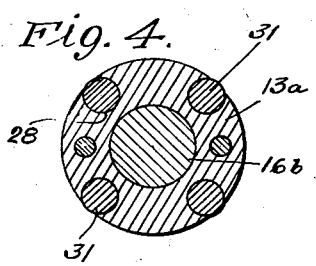
Fig. 4 is a body section taken on line 4—4 of Fig. 1.

As best illustrated in Fig. 4, the body 13 contains a plurality of vertically extending and equally circularly spaced recesses 28, the upper ends of which are closed by a retaining ring 29 secured to the body by screws 30. Ring 29 bears against the mandrel shoulder 40 to prevent member 16b from becoming jarred loose and moving upwardly in the mandrel from the position shown, as a result of the repeated downward impacts of 16b against the sleeve 12 during operation of the tool. Recesses 28 contain rollers 31 which project slightly beyond the cylindric surface of the body, the circular extent of the recesses being sufficient to retain the rollers. Preferably, the rollers fit the recesses with sufficient looseness as to permit their rotation while in engagement with the casing during rotation of the body.

In well casing swedging operations it may be desired to maintain a flow of circulating fluid through the tool so that the fluid will be discharged in the vicinity of the swedging sleeve. For this purpose I drill the full length of the mandrel to provide a bore 41 through which the fluid is discharged downwardly from pipe 19 through the tool and out the lower enlarged end 16a of the mandrel.

In operation, the tool is lowered within the casing on the lower end of the drill string until the swedge sleeve 12 engages the collapsed wall 11a. Thereupon, the pipe string is rotated and the necessary amount of weight applied to the swedge sleeve via engagement with the body 13 at the cam surfaces 17 and 18. As the pipe is rotated in the direction of the arrow, body cam surface 18 rises over the sleeve surface 17 and, twice during one complete revolution, the body shoulders 25 slip-off the corresponding shoulders on the sleeve, causing the mandrel to impact downwardly against the sleeve counterbore shoulder 27, see Fig. 3. Thus as the body rotates relative to the sleeve, the latter is subjected to a succession of downwardly applied blows, acting to drive it between the collapsed walls 11a of the casing and to expand the latter to the diameter of the upper portion 15 of the sleeve. The casing then is rounded out to true circular form by the action of the equally spaced rollers 31 whose outer peripheries travel a true circular path.

The provision for substantial relative longitudinal movement between the sleeve 12 and mandrel may be utilized to advantage in an upward jarring operation to free the sleeve from the casing in the event the sleeve should become tightly wedged within the casing. By repeated upward jarring movements of the pipe string and mandrel, the enlargement 16a on the lower end of the mandrel is caused to impact against the lower end of the sleeve, and thereby drive it upwardly from wedged position in the casing. It may be mentioned that the lower reduced portion of the mandrel within the sleeve may be made as long as is necessary or desired to enable the mandrel to deliver to the sleeve an effective blow in the upward jarring operation.

It will be understood that the drawing is merely typical and illustrative of the invention in one of its preferred forms, and that various changes in modifications may be made without departure from the invention in its true spirit and scope.

I claim:

1. In a pipe swedge, a body comprising a member shaped to expand the pipe from collapsed condition by advancement through the pipe, driving means connected to said body, and means adapted to be inserted within the pipe and coacting with said member to transmit thereto a succession of advancing blows by rotation of said driving means.

2. In a pipe swedge, a body comprising a member shaped to expand the pipe from collapsed condition by advancement through the pipe, driving means connected to said body, means adapted to be inserted within the pipe and coacting with said member to transmit thereto a succession of advancing blows by rotation of said driving means, and means operated by rotation of said driving means for rounding out the pipe after it has been expanded by said member.

3. In a pipe swedge, a body comprising a member having a longitudinally curved tapered surface adapted to engage and expand the pipe from collapsed condition by advancement through the pipe, driving means connected to said body, means adapted to be inserted within the pipe and coacting with said member to transmit thereto a succession of advancing blows by rotation of said driving means, and a plurality of rollers carried by said body and operating to round out the pipe after it has been expanded by said member.

4. In a pipe swedge, a body adapted to be inserted in a pipe and comprising a pair of relatively rotatable sections, one of said sections being adapted to engage and expand the pipe from collapsed condition by advancement through the pipe, rotatable driving means connected to said body and adapted to cause said sections to rotate relatively, and means for transmitting to the first mentioned body section a succession of advancing blows by virtue of relative rotation between the sections.

5. In a pipe swedge, a body adapted to be inserted in a pipe and comprising a pair of relatively rotatable sections, one of said sections being adapted to engage and expand the pipe from collapsed condition by advancement through the pipe, rotatable driving means connected to said body and adapted to cause said sections to rotate relatively, means for transmitting to the first mentioned body section a succession of advancing blows by rotation of said driving means, and means operated by the driving means for rounding out the pipe after it has been expanded by the first mentioned body section.

6. In a pipe swedge, a body adapted to be inserted in a pipe and comprising a pair of relatively rotatable sections, one of said sections being adapted to engage and expand the pipe from collapsed condition by advancement through the pipe, means carried by the other of said sections for rounding out the pipe, rotatable driving means connected to said body and adapted to cause said sections to rotate relatively, and means for transmitting to the first mentioned body section a succession of advancing blows by virtue of relative rotation between the sections.

7. A pipe swedge comprising a body adapted to be inserted in a pipe, a mandrel extending axially from one end of said body, rotatable driving means extending from the opposite end of the body, a swedge sleeve mounted on said mandrel and movable longitudinally and rotatably relative to both the mandrel and body, and interengaging annular cam surfaces on said body and sleeve having abrupt slip-off shoulders, whereby the body imparts to the sleeve a succession of advancing blows upon rotation relative thereto.

8. A pipe swedge comprising a body adapted to be inserted in a pipe and a mandrel extending axially from one end of said body, rotatable driving means extending from the opposite end of the body, a swedge sleeve mounted on said mandrel and movable longitudinally and rotatably relative to both the mandrel and body, interengaging annular cam surfaces on said body and sleeve having abrupt slip-off shoulders, whereby the body imparts to the sleeve a succession of advancing blows upon rotation relative thereto, and means carried by said body for engaging and rounding out the pipe.

9. A pipe swedge comprising a body adapted to be inserted in a pipe and a mandrel extending axially from one end of said body, rotatable driving means extending from the opposite end of the body, a swedge sleeve mounted on said mandrel and movable longitudinally and rotatably relative to both the mandrel and body, interengaging annular cam surfaces on said body and sleeve having abrupt slip-off shoulders, whereby the body imparts to the sleeve a succession of advancing blows upon rotation relative thereto, and a plurality of rollers carried in circularly spaced recesses in the surface of said body.

10. A pipe swedge comprising a body adapted to be inserted in a pipe and a mandrel extending axially from one end of said body, rotatable driving means extending from the opposite end of the body, a swedge sleeve mounted on said mandrel and movable longitudinally and rotatably relative to both the mandrel and body, interengaging annular cam surfaces on said body and sleeve having abrupt slip-off shoulders, whereby the body imparts to the sleeve a succession of advancing blows upon rotation relative thereto, a plurality of rollers carried in circularly spaced recesses in the surface of said body, and a roller retaining ring closing the ends of said recesses and secured to the body.

WELDON C. ERWIN.